March 31, 1942.  A. G. HORVATH  2,277,864
MEANS AND METHOD OF COILING A HOSE
Filed Sept. 3, 1940
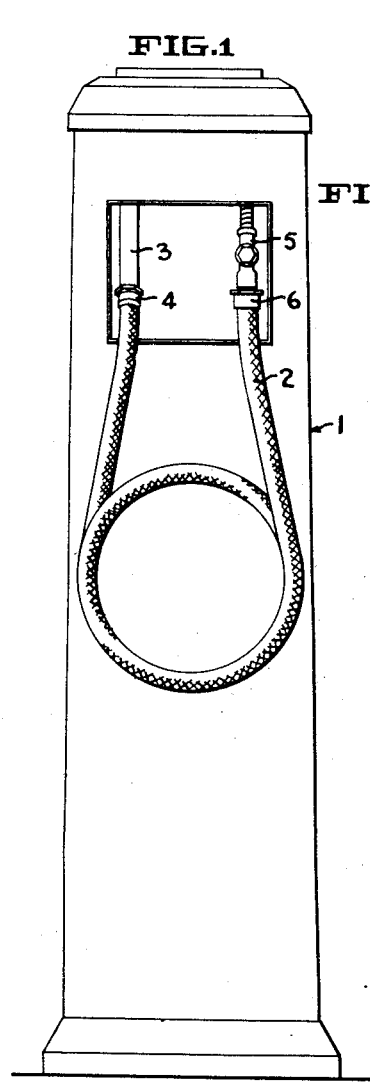
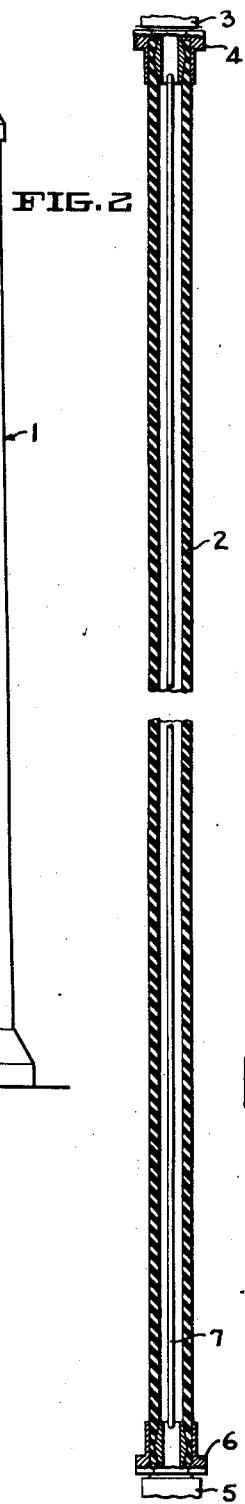
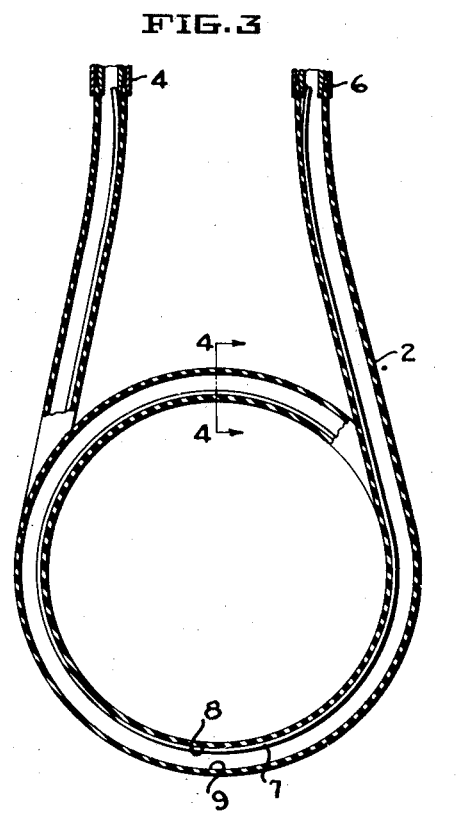
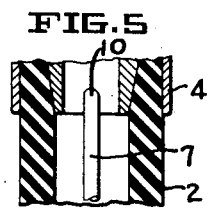
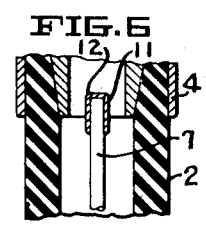
INVENTOR
ANTHONY G. HORVATH
BY
Toulmin + Toulmin
ATTORNEYS Patented Mar. 31, 1942

2,277,864

UNITED STATES PATENT OFFICE 2,277,864

MEANS AND METHOD OF COILING HOSE

Anthony G. Horvath, Dayton, Ohio, assignor to The Dayton Pump & Mfg. Co., Dayton, Ohio, a corporation of Ohio Application September 3, 1940, Serial No. 355,183

2 Claims. (Cl. 138—61)

This invention relates to the coiling of a hose and more particularly to the coiling of a hose such as is commonly employed for the dispensing of fluids such as gasoline from a gasoline pump, wherein the hose has a fixed end and a free nozzle end and is supported during periods of non-use by the fixed and free ends, the loop being allowed to hang downwardly. In the past, much difficulty has been occasioned with such dispensing hose by reason of the hose striking the pump base or the island upon which the pump is disposed, or being caught by the bumper of an automobile driving past the pump. My invention makes possible the use of a longer hose, which is longer than those heretofore considered feasible, without these attendant disadvantages. In the past, the length of hose has been limited to a length not materially greater than twice the distance from the point of attachment of the hose to the pump base.

The principal object of my invention is to make it possible to use a longer hose by providing means for coiling the hose up into position well above the pump base, the coiling means being such that the hose automatically assumes its coiled out-of-the-way position when the free nozzle end of the hose is returned to the pump.

Another object is to provide a hose with a coiling resilient member inside of the hose, which member retains its position by reason of the frictional engagement of the member with the inside walls of the hose.

Still another object is to devise a method of preparing a coiled hose.

Still other objects will more fully hereinafter appear.

In the accompanying drawing:

Figure 1 is a side elevation of a gasoline pump, or similar dispensing pump provided with a coiled hose of the present invention.

Figure 2 is longitudinal sectional view through the hose, showing the disposition of the hose and spring steel wire prior to the coiling operation.

Figure 3 is a vertical sectional view through the hose of Figure 1 showing the relative position of the hose and coiling wire therein.

Figure 4 is a transverse section on the line 4—4 of Figure 3.

Figure 5 is a detailed enlarged sectional view of one end of the hose of Figure 2.

Figure 6 is a detailed enlarged sectional view of a modification.

In the drawing, reference numeral 1 designates the gasoline pump or dispensing device which is equipped with a hose coiled in accordance with the present invention. The hose itself is designated by the reference numeral 2 and is made of any suitable resilient material such as the usual rubber or canvas and rubber, the material of which the hose is made constituting no part of the present invention so long as it is flexible and is adapted to be coiled in the manner shown. Hose 2 has a fluid receiving end or coupling 3 which is semipermanently attached to the pump contained within the housing 1. This member 3 is attached to the fixed end of the hose as by means of a nipple 4 so that the hose is adapted to receive fluid from member 3. The free end of the hose is provided with the usual dispensing nozzle 5 to which it is attached by means of a nipple 6. During periods of nonuse, the free end of the hose is adapted to be received by any suitable means disposed adjacent the top of the pump 1 and at substantially the same level as the fixed end of the hose.

In order to render the hose self-coiling so that it will automatically assume a coiled out-of-the-way position as shown in Figure 1 when it is returned to the position of nonuse in Figure 1, a strong spring steel wire 7 is disposed within the hose 2, while the hose is in the initial straight position of Figure 2. This wire 7 will be substantially straight, as also indicated in Figure 2. The wire 7 preferably will extend throughout the flexible portion of the hose 2, that is, from a point within fixed nipple 4 to a point within free nozzle nipple 6, although, if desired, wire 7 may be shorter than this, provided it is long enough to impart the desired coiling characteristic to the hose assembly.

With the hose 2 and the wire 7 in substantially the position of Figure 2, the assembly is then coiled either manually or by means of a suitable machine to give it the desired coiled form of Figures 1 and 3 whereby there will be provided the required vertical take up in the hose as mounted on pump 1. Any desired number of turns in the coiled hose may be provided. In a preferred form, the hose is provided with one and one-half turns, as indicated in Figures 1 and 3. It is desirable that the points of beginning and end of coiling be on the opposite sides of the coiled assembly, as indicated in the drawing, whereby a neater and more practicable assembly is obtained.

As a result of the coiling operation, the spring steel wire 7 will assume substantially the position shown in Figure 3 in which it is in intimate frictional contact with a large portion of the inner wall of the hose. In this way, the wire 7 tends to retain its original coiled position and does not slip out of place. As shown in Figures 3 and 4, wire 7 is in frictional contact with the inner inside portion 8 of the hose rather than in frictional contact with the outer inside portion 9.

As will be obvious, the strength of spring steel wire 7 will be gauged with reference to the strength of hose 2 so as to overcome any tendency of hose 2 to assume a straight position and to force hose 2 to assume a coiled position. It will also be apparent that the force required to carry out the coiling operation will be considerably greater than any force tending to straighten out wire 7 encountered during normal use of the hose. It will further be understood that during the servicing of an automobile, if necessary, hose 2 may be extended to substantially a straight position, but when it assumes such a straight position, the resilient wire 7 will assume a position frictionally touching the inside wall of the hose 2 at a number of spaced points. Thus there will be no tendency for resilient member 7 to slide out of proper position although the coiled hose 2 be stretched to the substantially straight form.

From Figure 5, it will appear that in a preferred form the ends 10 of the wire 7 are given a hemispherical configuration so that even though wire 7 move during coiling or during use to such an extent that end 10 is in contact with the rubber or other material of which the hose 2 is made, it will not chafe or wear the same. This rounding of the ends of wire 7 further serves to prevent wire 7 from unduly chafing or scarring the nipples 4 or 6 which are usually made of relatively soft non-ferrous metal such as brass or bronze.

In Figure 6, the wire 7 has the usual straight end which is provided with a cap 11 which presents an enlarged end which is not so apt to wear the rubber of the hose 2. This cap 11 may be provided with rounded corners 12 which further prevent injury to the material of the hose 2. Further, cap 11 may be made of any suitable non-ferrous material such as brass or bronze or other soft metal so as to minimize the possibility of injury to the rubber or to the nipples 4 or 4 and 6. This non-ferrous cap 11 may further serve to prevent corrosion or rusting, or other electro-chemical action upon wire 7. It will further be seen that since wire 7 is of relatively small cross-sectional area, its presence will not interfere substantially with the flow of liquid through the hose 2.

I wish it to be understood that I intend to include as within my invention such modifications as may be necessary to adapt it to varying conditions and uses and as fall within the scope of the appended claims.

Having thus fully described my invention, what I claim as new and desire to secure by Letters Patent is:

1. In combination, a flexible hollow hose normally tending to assume a straight position, and an unattached spring steel wire disposed therein and held therein by frictional engagement only, said wire being biased to coiled position and biasing said hose to coiled position, but being adapted to yieldingly allow said hose to be uncoiled, and to return the same to coiled position.

2. In combination, a flexible hollow hose normally tending to assume a straight position, and an unattached spring steel wire disposed therein and held therein by frictional engagement only, said wire being biased to coiled position and biasing said hose to coiled position, but being adapted to yieldingly allow said hose to be uncoiled, and to return the same to coiled position, and a protecting cap extending over the end of said wire.

ANTHONY G. HORVATH.